(12) United States Patent
Glaser et al.

(10) Patent No.: US 8,868,981 B2
(45) Date of Patent: Oct. 21, 2014

(54) ON-DEMAND SERVICES ENVIRONMENT TESTING FRAMEWORK

(75) Inventors: Scott Glaser, Dublin, CA (US); Poonguzhali Balasubramanian, Fremont, CA (US)

(73) Assignee: salesforce.com, inc., San Francisco, CA (US)

(*) Notice: Subject to any disclaimer, the term of this patent is extended or adjusted under 35 U.S.C. 154(b) by 313 days.

(21) Appl. No.: 12/939,092

(22) Filed: Nov. 3, 2010

(65) Prior Publication Data

US 2012/0042210 A1    Feb. 16, 2012

Related U.S. Application Data

(60) Provisional application No. 61/373,155, filed on Aug. 12, 2010.

(51) Int. Cl.
*G06F 11/00* (2006.01)
*G06F 11/36* (2006.01)

(52) U.S. Cl.
CPC ........ *G06F 11/3692* (2013.01); *G06F 11/3688* (2013.01); *G06F 11/3684* (2013.01)
USPC ................... 714/45; 714/46; 714/25

(58) Field of Classification Search
CPC .......................... G06F 11/3688; G06F 11/3684
USPC .......................... 714/25, 45, 46, 57
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |

(Continued)

*Primary Examiner* — Sarai Butler
(74) *Attorney, Agent, or Firm* — Ingrassia Fisher & Lorenz, P.C.

(57) ABSTRACT

In one embodiment, a method of providing a test framework in an on-demand services environment can include: accessing a plurality of tests via plug-ins to a core platform of the test framework; receiving, by a user interface, a selection of tests for execution from the plurality of tests, where the selected tests are configured to test a plurality of layers of a product; executing, by an execution engine coupled to the core platform, the selected tests; storing test results for the executed selected tests on a configurable repository; and reporting the stored test results in a summarized form on the user interface.

32 Claims, 10 Drawing Sheets

(56) References Cited

U.S. PATENT DOCUMENTS

| | | |
|---|---|---|
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,334,166 B1 * | 2/2008 | Rhea et al. ............... 714/46 |
| 7,340,411 B2 | 3/2008 | Cook |
| 7,620,655 B2 | 11/2009 | Larsson et al. |
| 7,698,160 B2 | 4/2010 | Beaven et al. |
| 8,082,301 B2 | 12/2011 | Ahlgren et al. |
| 8,095,413 B1 | 1/2012 | Beaven |
| 8,095,594 B2 | 1/2012 | Beaven et al. |
| 8,117,601 B2 * | 2/2012 | Owens et al. ............. 717/128 |
| 8,275,836 B2 | 9/2012 | Beaven et al. |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0028856 A1 * | 2/2003 | Apuzzo et al. ............. 717/124 |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0153775 A1 * | 8/2004 | Bhattacharjee et al. ........ 714/25 |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2007/0220341 A1 * | 9/2007 | Apostoloiu et al. ............ 714/33 |
| 2008/0010535 A1 * | 1/2008 | Dasgupta ...................... 714/38 |
| 2009/0210748 A1 * | 8/2009 | Hohmann et al. ............ 714/32 |
| 2009/0307763 A1 * | 12/2009 | Rawlins et al. .................. 726/5 |

\* cited by examiner

ON-DEMAND SERVICES ENVIRONMENT TESTING FRAMEWORK

CLAIM OF PRIORITY

This application claims the benefit of U.S. Provisional Patent Application 61/373,155 entitled ON-DEMAND SERVICES ENVIRONMENT TESTING FRAMEWORK, filed Aug. 12, 2010, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The subject matter described herein relates generally to a test framework for an on-demand service environment.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

In order to provide test coverage for software products or applications, different testing tools are typically utilized for different layers or aspects of the products. For example, one test tool might be provided to test a web interface for the software product, while a different test tool may be used for a database associated with the product. Thus, performing a full testing of all layers of a product may require working with different test tools from different vendors, and handling different scheduling requirements and ways for controlling the various test operations. These types of approaches can increase test costs and time to market for the product.

BRIEF DESCRIPTION OF THE DRAWINGS

In the following drawings like reference numbers are used to refer to like elements. Although the following figures depict various examples of the invention, the invention is not limited to the examples depicted in the figures.

DETAILED DESCRIPTION

Example General Overview

Approaches are provided for a test framework. These approaches, such as various apparatuses, systems, and methods, are described herein with reference to examples applicable to a multi-tenant database system. These approaches are also applicable to many other computing environments, including an MS Windows operating system environment, any web-browsing environment, an Apple OS operating environment, a cellular phone environment, etc.

As used herein, an example multi-tenant database system includes those systems in which various elements of hardware and software of the database system may be shared by one or more customers. For example, a given application server may simultaneously process requests for a great number of customers, and a given database table may store rows for a potentially much greater number of customers.

Example System Overview

As noted above, the example multi-tenant database system as described herein represents only one possible example system where particular embodiments may be utilized. One or more embodiments are applicable to a wide variety of other systems and/or arrangements.

Figure 1:
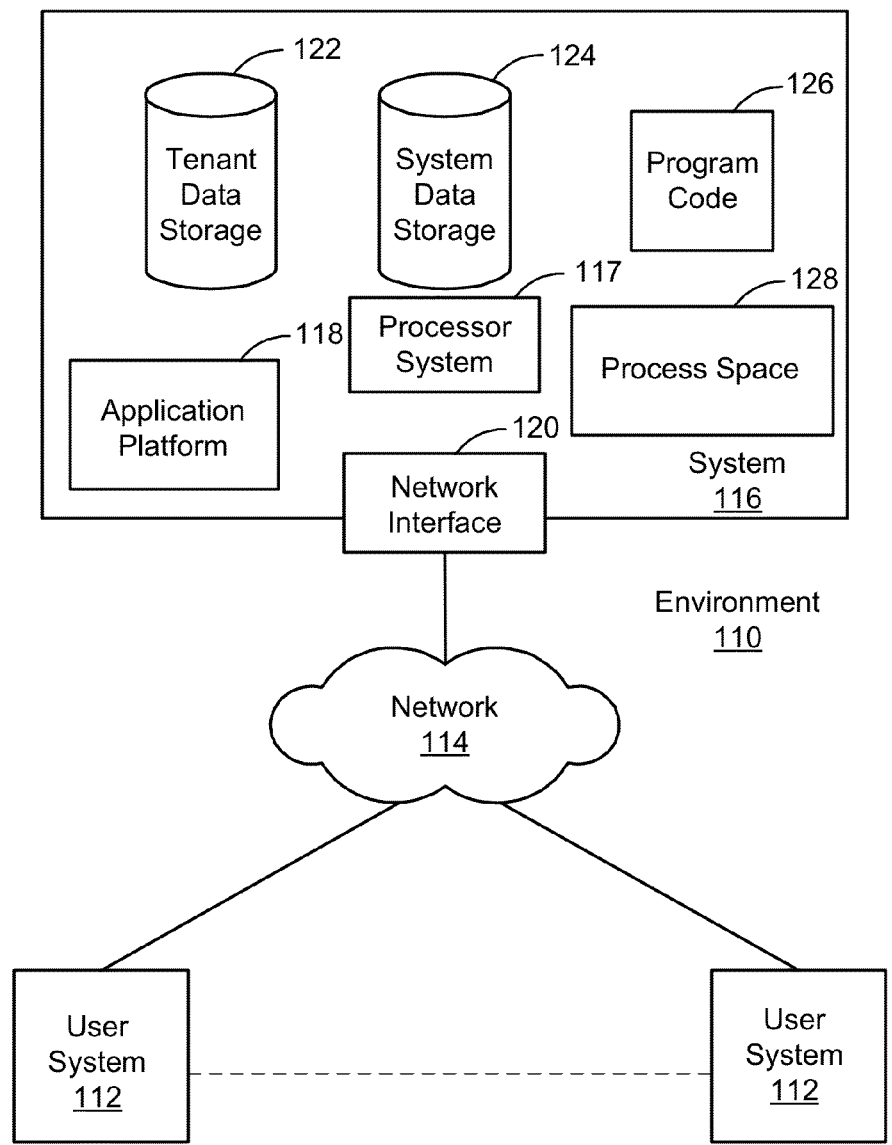
FIG. 1 illustrates a block diagram of an example environment wherein an on-demand database service might be used.

FIG. 1 illustrates a block diagram of an environment 110 wherein an on-demand database service might be used. Environment 110 may include user systems 112, network 114, system 116, processor system 117, application platform 118, network interface 120, tenant data storage 122, system data storage 124, program code 126, and process space 128. In other embodiments, environment 110 may not have all of the components listed and/or may have other elements instead of, or in addition to, those listed above.

Environment 110 is an environment in which an on-demand database service exists. User system 112 may be any machine or system that is used by a user to access a database user system. For example, any of user systems 112 can be a handheld computing device, a mobile phone, a laptop computer, a work station, and/or a network of computing devices. As illustrated in FIG. 1 (and in more detail in FIG. 2) user systems 112 might interact via a network 114 with an on-demand database service, which is system 116.

An on-demand database service, such as system 116, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 116" and "system 116" will be used interchangeably herein. A database image may include one or more database objects. A relational database management system (RDMS) or the equivalent may execute storage and retrieval of information against the database object(s). Application platform 118 may be a framework that allows the applications of system 116 to run, such as the hardware and/or software, e.g., the operating system. In an embodiment, on-demand database service 116 may include an application platform 118 that enables creation, managing and executing one or more applications developed by the provider of the on-demand database service, users accessing the on-demand database service via user systems 112, or third party application developers accessing the on-demand database service via user systems 112.

The users of user systems 112 may differ in their respective capacities, and the capacity of a particular user system 112 might be entirely determined by permissions (permission levels) for the current user. For example, where a salesperson is using a particular user system 112 to interact with system 116, that user system has the capacities allotted to that salesperson. However, while an administrator is using that user system to interact with system 116, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 114 is any network or combination of networks of devices that communicate with one another. For example, network 114 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the present invention might use are not so limited, although TCP/IP is a frequently implemented protocol.

User systems 112 might communicate with system 116 using TCP/IP and, at a higher network level, use other common Internet protocols to communicate, such as HTTP, FTP, AFS, WAP, etc. In an example where HTTP is used, user system 112 might include an HTTP client commonly referred to as a "browser" for sending and receiving HTTP messages to and from an HTTP server at system 116. Such an HTTP server might be implemented as the sole network interface between system 116 and network 114, but other techniques might be used as well or instead. In some implementations, the interface between system 116 and network 114 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 116, shown in FIG. 1, implements a web-based customer relationship management (CRM) system. For example, in one embodiment, system 116 includes application servers configured to implement and execute CRM software applications as well as provide related data, code, forms, webpages and other information to and from user systems 112 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 116 implements applications other than, or in addition to, a CRM application. For example, system 16 may provide tenant access to multiple hosted (standard and custom) applications, including a CRM application. User (or third party developer) applications, which may or may not include CRM, may be supported by the application platform 118, which manages creation, storage of the applications into one or more database objects and executing of the applications in a virtual machine in the process space of the system 116.

One arrangement for elements of system 116 is shown in FIG. 1, including a network interface 120, application platform 118, tenant data storage 122 for tenant data 123, system data storage 124 for system data 125 accessible to system 116 and possibly multiple tenants, program code 126 for implementing various functions of system 116, and a process space 128 for executing MTS system processes and tenant-specific processes, such as running applications as part of an application hosting service. Additional processes that may execute on system 116 include database indexing processes.

Several elements in the system shown in FIG. 1 include conventional, well-known elements that are explained only briefly here. For example, each user system 112 could include a desktop personal computer, workstation, laptop, PDA, cell phone, or any wireless access protocol (WAP) enabled device or any other computing device capable of interfacing directly or indirectly to the Internet or other network connection. User system 112 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 112 to access, process and view information, pages and applications available to it from system 116 over network 114. Each user system 112 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 116 or other systems or servers. For example, the user interface device can be used to access data and applications hosted by system 116, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 112 and all of its components are operator configurable using applications, such as a browser, including computer code run using a central processing unit such as an Intel Pentium® processor or the like. Similarly, system 116 (and additional instances of an MTS, where more than one is present) and all of their components might be operator configurable using application(s) including computer code to run using a central processing unit such as processor system 117, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 116 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments of the present invention can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 116 is configured to provide webpages, forms, applications, data and media content to user (client) systems 112 to support the access by user systems 112 as tenants of system 116. As such, system 116 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 2:
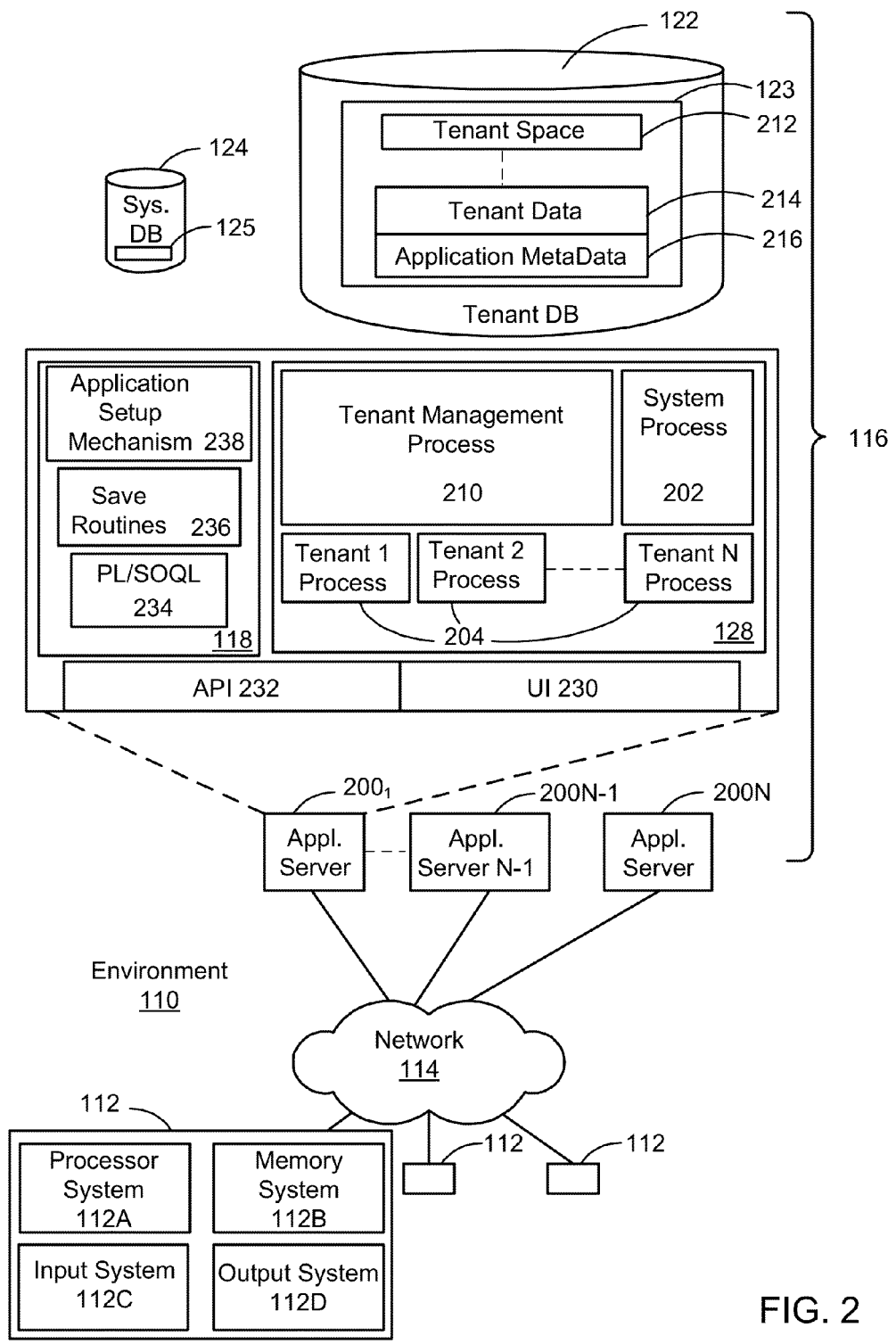
FIG. 2 illustrates a block diagram of example elements of FIG. 1 and various possible interconnections between these elements.

FIG. 2 also illustrates environment 110. However, in FIG. 2 elements of system 116 and various interconnections in an embodiment are further illustrated. FIG. 2 shows that user system 112 may include processor system 112A, memory system 112B, input system 112C, and output system 112D. FIG. 2 shows network 114 and system 116. FIG. 2 also shows that system 116 may include tenant data storage 122, tenant data 123, system data storage 124, system data 125, User Interface (UI) 230, Application Program Interface (API) 232, PL/SOQL 234, save routines 236, application setup mechanism 238, applications servers $200_1$-$200_N$, system process space 202, tenant process spaces 204, tenant management process space 210, tenant storage area 212, user storage 214, and application metadata 216. In other embodiments, environment 110 may not have the same elements as those listed above and/or may have other elements instead of, or in addition to, those listed above.

User system 112, network 114, system 116, tenant data storage 122, and system data storage 124 were discussed above in FIG. 1. Regarding user system 112, processor system 112A may be any combination of one or more processors. Memory system 112B may be any combination of one or more memory devices, short term, and/or long term memory. Input system 112C may be any combination of input devices, such as one or more keyboards, mice, trackballs, scanners, cameras, and/or interfaces to networks. Output system 112D may be any combination of output devices, such as one or more monitors, printers, and/or interfaces to networks. As shown by FIG. 2, system 116 may include a network interface 120 (of FIG. 1) implemented as a set of HTTP application servers 200, an application platform 118, tenant data storage 122, and system data storage 124. Also shown is system process space 202, including individual tenant process spaces 204 and a tenant management process space 210. Each application server 200 may be configured to tenant data storage 122 and the tenant data 123 therein, and system data storage 124 and the system data 125 therein to serve requests of user systems 112. The tenant data 123 might be divided into individual tenant storage areas 212, which can be either a physical arrangement and/or a logical arrangement of data. Within each tenant storage area 212, user storage 214 and application metadata 216 might be similarly allocated for each user. For example, a copy of a user's most recently used (MRU) items might be stored to user storage 214. Similarly, a copy of MRU items for an entire organization that is a tenant might be stored to tenant storage area 212. A UI 230 provides a user interface and an API 232 provides an application programmer interface to system 116 resident processes to users and/or developers at user systems 112. The tenant data and the system data may be stored in various databases, such as one or more Oracle™ databases.

Application platform 118 includes an application setup mechanism 238 that supports application developers' creation and management of applications, which may be saved as metadata into tenant data storage 122 by save routines 236 for execution by subscribers as one or more tenant process spaces 204 managed by tenant management process 210 for example. Invocations to such applications may be coded using PL/SOQL 234 that provides a programming language style interface extension to API 232. Invocations to applications may be detected by one or more system processes, which manages retrieving application metadata 216 for the subscriber making the invocation and executing the metadata as an application in a virtual machine.

Each application server 200 may be communicably coupled to database systems, e.g., having access to system data 125 and tenant data 123, via a different network connection. For example, one application server $200_1$ might be coupled via the network 114 (e.g., the Internet), another application server $200_{N-1}$ might be coupled via a direct network link, and another application server $200_N$ might be coupled by yet a different network connection. Transfer Control Protocol and Internet Protocol (TCP/IP) are typical protocols for communicating between application servers 200 and the database system. However, it will be apparent to one skilled in the art that other transport protocols may be used to optimize the system depending on the network interconnect used.

In certain embodiments, each application server 200 is configured to handle requests for any user associated with any organization that is a tenant. Because it is desirable to be able to add and remove application servers from the server pool at any time for any reason, there is preferably no server affinity for a user and/or organization to a specific application server 200. In one embodiment, therefore, an interface system implementing a load balancing function (e.g., an F5 Big-IP load balancer) is communicably coupled between the application servers 200 and the user systems 112 to distribute requests to the application servers 200. In one embodiment, the load balancer uses a least connections algorithm to route user requests to the application servers 200. Other examples of load balancing algorithms, such as round robin and observed response time, also can be used. For example, in certain embodiments, three consecutive requests from the same user could hit three different application servers 200, and three requests from different users could hit the same application server 200. In this manner, system 116 is multi-tenant, wherein system 116 handles storage of, and access to, different objects, data and applications across disparate users and organizations.

As an example of storage, one tenant might be a company that employs a sales force where each salesperson uses system 116 to manage their sales process. Thus, a user might maintain contact data, leads data, customer follow-up data, performance data, goals and progress data, etc., all applicable to that user's personal sales process (e.g., in tenant data storage 122). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 116 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 116 might also maintain system level data usable by multiple tenants or other data. Such system level data might include industry reports, news, postings, and the like that are sharable among tenants.

In certain embodiments, user systems 112 (which may be client systems) communicate with application servers 200 to request and update system-level and tenant-level data from system 116 that may require sending one or more queries to tenant data storage 122 and/or system data storage 124. System 116 (e.g., an application server 200 in system 116) automatically generates one or more SQL statements (e.g., one or more SQL queries) that are designed to access the desired information. System data storage 124 may generate query plans to access the requested data from the database.

Test Framework

Particular embodiments are directed to an integrated platform that can accommodate a wide variety of testing tools for testing various "layers" of a software product or application. Examples of such layers include a user interface (UI) layer, an application programming interface (API) layer, and a database layer. By using of "plug-ins" that include test drivers, any suitable test tool can be integrated with a common core platform. Thus, what would otherwise be a piecemeal or patchwork of discrete tests from various vendors can be integrated in plug-and-play fashion to provide multilayer testing coverage for products.

Particular embodiments provide the capability of testing different layers of an application/product in a single test framework. In one embodiment, a method of providing a test framework in an on-demand services environment can include: accessing a plurality of tests via plug-ins to a core platform of the test framework; receiving, by a user interface, a selection of tests for execution from the plurality of tests, where the selected tests are configured to test a plurality of layers of a product; executing, by an execution engine coupled to the core platform, the selected tests; storing test results for the executed selected tests on a configurable repository; and reporting the stored test results in a summarized form on the user interface.

In one implementation, techniques and mechanisms for providing a test framework include controlling execution of a plurality of tests, e.g., in terms of test timing, test layer application, execution arrangement, and test result format. For example, test timing can be controlled as on-demand, per a predetermined or otherwise configured schedule, and/or by event triggering based on occurrence of a designated event. In addition, various layers of a product can be tested, such as graphical user interface (GUI), web service, API, database, and network test layers. Execution of the tests may occur from a single execution engine reading parameterized test data, e.g., from extensible markup language (XML), character-separated values (CSV) files, or any other suitable input test data.

These techniques and mechanisms can also include techniques and mechanisms for queuing tests to be run sequentially and/or in parallel from a configurable pool of test clients. For example, various layers of a product can be tested simultaneously, such as by use of a distributed environment whereby different test clients can test different layers or environments related to the product. The techniques and mechanisms can also capture errors by an error recovery system, while test logs and results may be collected and stored in a configurable repository or "dashboard" for summarized test reporting. The dashboard itself can serve as a user interface for viewing test results, or a separate user interface (e.g., a web browser), such as at a different location, can also access test results at any time via the dashboard/repository.

Such techniques and mechanisms of a test framework can be employed to provide a faster time to market for delivery of high-quality products, as well as increased return on investment (ROI) by reducing testing time, and thereby enabling additional feature delivery for products. Due to on-demand and scheduled test selection, testing can occur more frequently, and can also reduce testing costs by capturing critical defects before such defects reach production. In addition, test coverage, as well as breath of tests, can be improved, by improving workability with any suitable test tool, and providing coverage for multiple product layers. Also, repeatability and reusability of tests, as well as improved product release predictability, can be provided by more efficiently planning and scheduling tests as compared to other approaches. Such techniques and mechanisms can also be employed in performing test data generation for accessing test results, environment setup for testing products in different test environments, as well as simulating user/data load and/or stress testing.

Techniques and mechanisms of the test framework can also be independent of, e.g., application, operating system, application platform, and web browser. Further, certain embodiments allow for testing at different layers of a product (e.g., GUI, Web services (WS), API, database (DB), network, etc.), and in different testing environments. Tests can also be driven with different data sets, and may be run on-demand, per a predetermined schedule, and/or or triggered based off an event. For example, a user interface can be employed such that a user can select which type of test scheduling is to be applied for corresponding test layers, test tools, and/or test products. As will be discussed in more detail below, tests can also be run in parallel, and may support distributed (e.g., via test clients) or multi-tier environments.

Results from executed tests can also be archived, statistic analysis can be performed, and customizable reports can be generated therefrom. The test results being archived allows for review of those results at any time once available. For users seeking immediate access to test results, real-time notifications can be provided (e.g., via email, instant messaging (IM), rich site summary (RSS), etc.) of test status and/or thresholds. Such notification enabling, as well as preference for the particular type of notification, can also be set via user configurations. In addition, a logging facility with varying levels of verbosity and retrieval of archived logs can be employed. For example, a user may configure how much detail is to be stored for test results as part of the archival process. In some implementations, periods for archiving can also be specified (e.g., once a week, once a month, once a year, etc.), and also what types of test results to be archived can be specified. In this fashion, long-term storage can be controlled for a substantial number of tests. This may be particularly useful when a large amount of scheduled tests may be run, such as for a very large number of tenants or user systems 112.

In addition, test versions and descriptions of the various tests supported by the automation framework, can be organized. Version control can be used to ensure that a most up-to-date version of a particular test may be run upon execution. For example, source code version control can be used to manage and control updating and installation of test code. In addition, descriptions of various supported tests can be provided from storage (e.g., in association with test code or in a central file location) so that a user setting up or scheduling tests for different layers of a product can have access to these descriptions. In one implementation, a pop-up text bubble can provide a description for a given test on the user interface when a mouse is hovered over a test code file for that test. In another case, a separate descriptor file can be associated with each test for easy access by the user when scheduling that test.

In order to accommodate operating system independence, in one implementation, the test framework can be built upon Java™ technology. Use of Java™ technology can allow the framework to run on a variety of major operating system platforms. In addition, core platform code can be installed and updated as a Java™ archive (JAR) file. Such a test framework can also be built on a componentized modular design and a shared library, thus allowing additional modules for extension of new features.

Figure 3:
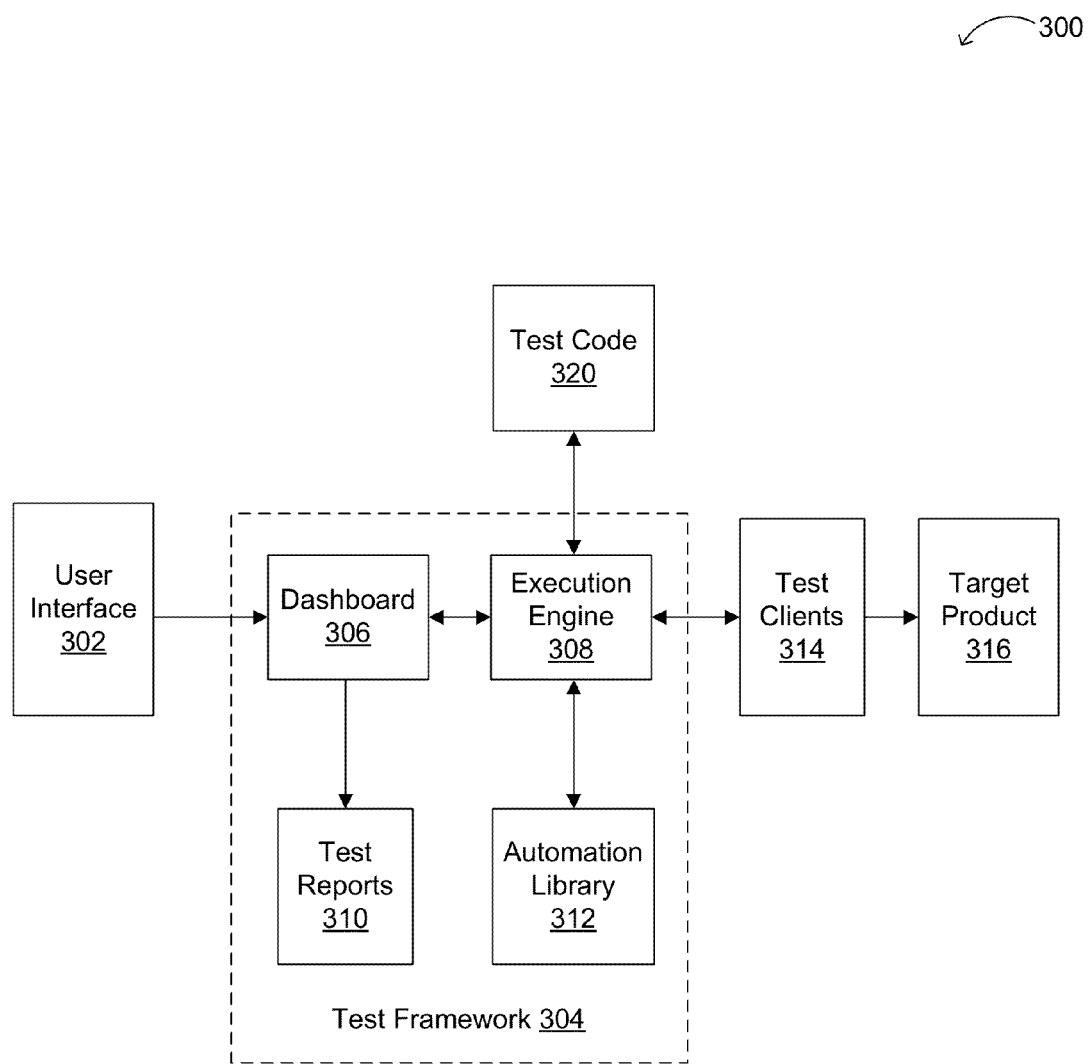
FIG. 3 is a block diagram of an example automation framework flow and arrangement, according to one embodiment.

FIG. 3 shows a block diagram of an example 300 automation framework flow/arrangement, according to one embodiment. User interface 302 can be, e.g., a configuration web user interface or browser. In one implementation, user interface 302 can be a web interface for a tenant or organization (e.g., on user system 112). User interface 302 can access work with dashboard 306, which can be a central dashboard for selecting tests to run, and also for storing test results (e.g., test reports 310).

In one implementation, dashboard 306 may be centrally located (e.g., in system 116), and user interface 302 may be remotely located on user system 112. Alternatively, dashboard 306 and user interface 302 may be the same interface, or co-located interfaces. In any event, user interface 302 can be any suitable type of interface, including an open source interface (e.g., Maven). Automation framework 304 can also include execution engine 308, which can be used for scheduling, executing, and collecting test artifacts. For example, execution engine 308 can be any suitable server or computing device.

Automation framework 304 can also include automation library or test library 312, which can be a library of utilities and tools used to form a core logic or "core platform" of automation framework and tests. In addition, test code 320 can utilize software configuration management (SCM) for tracking and controlling changes (e.g., via revision control and baseline establishment) in the software, and for accessing the latest test cases.

Test clients 314 can be utilized by execution engine 308 for distributed test execution. For example, test clients 314 can represent a pool of test clients where tests may be executed. Target product 316 can be the product or product line under test. Test clients 314 can also be used to test a product in a distributed environment, whereby each test client tests the product in a separate environment, or tests a separate layer of the product. For example, execution engine 308 can spawn up one test client 314 to test a UI layer, spawn up another test client 314 for API level testing, and still another test client 314 to test a database layer of the product.

As another example, a project "A" may be in environment A, while project "B" may be in environment B, and both environments/projects A and B can be tested simultaneously by using two test clients 314. A product may include one or more "projects," depending on the particular organization of the product itself or development thereof. Such test clients 314 can then report back test results for each layer and/or environment to automation framework 304. The test results can thus be collected, e.g., from various test clients 314 for reporting and summation. Test clients 314 can also be any combination of real and/or virtual machines. For example, test clients 314 may be a plurality of virtual machines in a single real machine, or test clients 314 may be a plurality of real machines. Also, test clients 314 may be co-located with test framework 304 (e.g., in system 116), or located in distributed fashion (e.g., in user systems 112).

In addition, various implementations of the test framework 304 can generate any suitable test reports 310. As will be discussed in more detail below with reference to FIG. 10, examples of such test reports include test trend reports, test result reports, as well as graphical data to provide test results in summarized form. Further, various aspects of the test result reporting are configurable by a user (e.g., via user interface 302, dashboard 306, etc.). One or more implementations provide for user configurability of summation forms of test result data (e.g., test statistics grid/chart, test trends, job statistics, build statistics, build executor status, build queue, etc.) for test reports 310. Various implementations also provide many other user configurations related to testing control and reporting. For example, real-time email, instant messages, and/or RSS feeds of testing status or other such notifications, can be configured.

Figure 4:
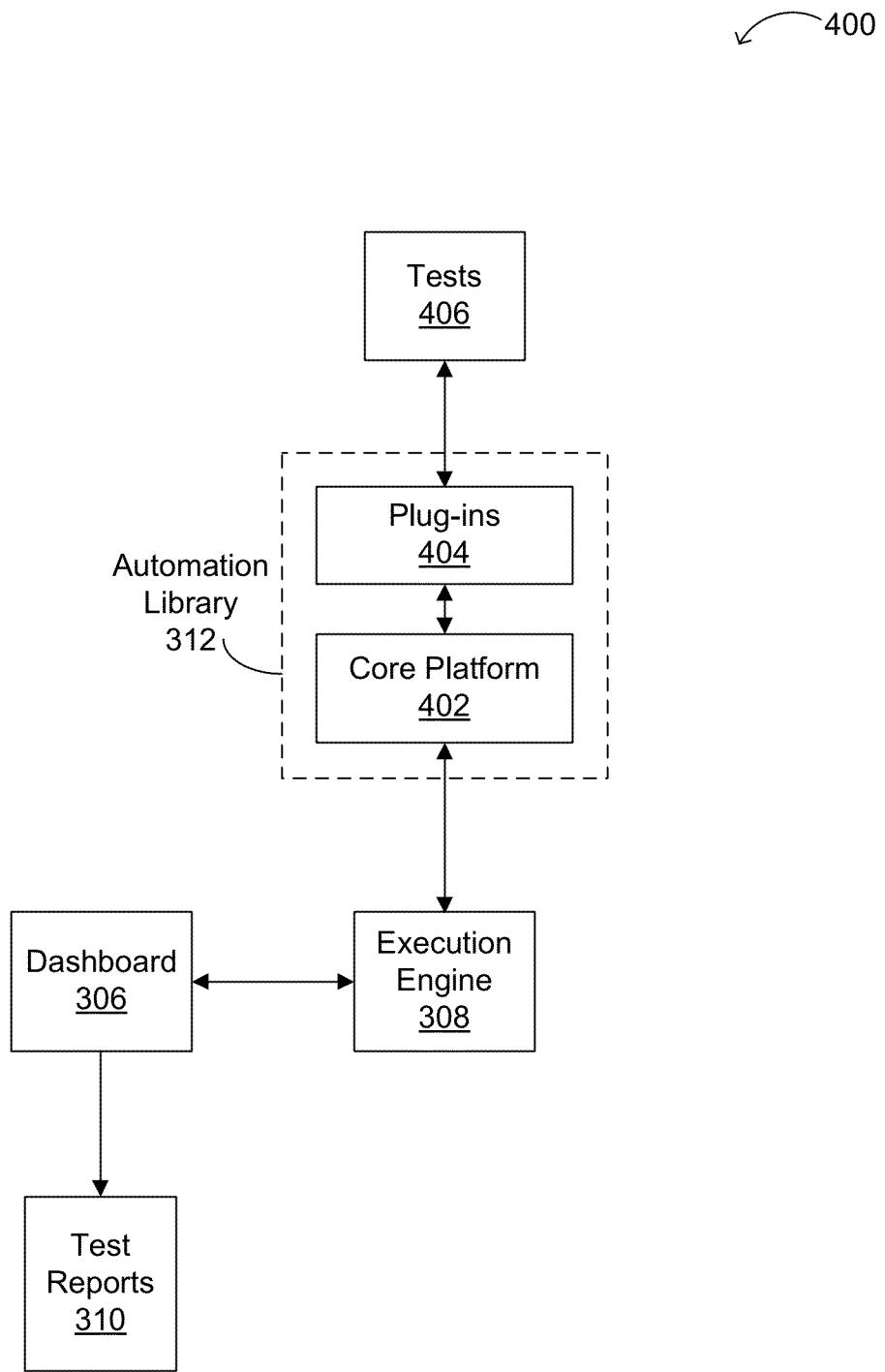
FIG. 4 is a block diagram of example automation framework structure, according to one embodiment.

FIG. 4 illustrates a block diagram of example automation framework structure 400, according to one embodiment. In one implementation, an automation framework can include an automation server or execution engine (e.g., 308), an automation library (e.g., 312), and an automation dashboard (e.g., 306). Execution engine 308 can include a server and/or a web application that may be installed on any web server container. Execution engine 308 may be configured to run jobs based on custom configurations. For example, such jobs that may be run on execution engine 308 include build, test, and deployment operations.

In one implementation, automation library 312 can include a Java™ archive for creating tests, loading test data, test execution drivers, logging, and verifying results. In this and other implementations, dashboard 306 can be used for categorizing and defining tests (e.g., via user configurable inputs), as well as collecting test status from each execution and archiving associated results. Such test results can be used by dashboard 306 to provide various test reports 310 (e.g., custom graphical analysis reports). As discussed above, the automation framework can run tests on-demand, scheduled, and/or based on a triggered event, and may also run tests in parallel by pooling requests and distributing the tests to test clients 314 for execution. Further, various implementations support test, and can provide customizable parsing of test logs for reporting and graphical analysis of test results.

Automation library 312 can also include core platform 402 and plug-ins 404. Plug-ins 404 can be used to extend the automation library to support any number of tests 406. For example, various tests 406 can represent different product lines and/or product layers. Plug-ins 404 can provide for an integrated system of self-contained modular testing components built upon a shared core platform. These pluggable components may act together as building blocks that provide test coverage for different layers (e.g., GUI, API, web service, database, network, etc.) of the product. Thus in various implementations, in order to support a new test, a new plug-in 404 can be added to extend the reach of core platform 402. Plug-ins 404 thus allow for integration of each type of testing tool. Once the test tools are defined for a particular product, plug-ins 404 can be identified or created to integrate the defined test tools (e.g., tests 406) into core platform 402. In this fashion, automation framework 304 is tool agnostic and extensible because each such test tool can be coupled with core platform 402 by use of appropriate plug-in 404.

The test framework in various implementations can also execute build or deployment tasks, where each job (e.g., build, test, deployment, etc.) may be configured as self-contained tasks that can trigger other jobs and provide execution results. In various implementations, such a job (e.g., a deployment or a test run) can be used as an event to trigger another job. A user can configure which specific jobs or types of jobs may be specified as an event for such event triggered operation. For example, a user can specify that a first test is an event, and that a second test is to run based on occurrence of the first test (e.g., an event trigger). Any number of such event definition and triggering can be supported in particular embodiments.

In addition, the automation framework may be controlled by a centralized dashboard 306, whereby tests definitions and test results are archived. Further, tests can be parameterized with test data (e.g., using XML, CSV, etc.) to supply test input. Such input test data can be provided via dashboard 306 to execution engine 308. For example, a file of test input can be accessed by (e.g., from a memory location or database) or otherwise sent to execution engine 308. Further, default test inputs, such as those derived from previous test runs of the same test, can also be utilized as test input data by execution engine 308.

Figure 5:
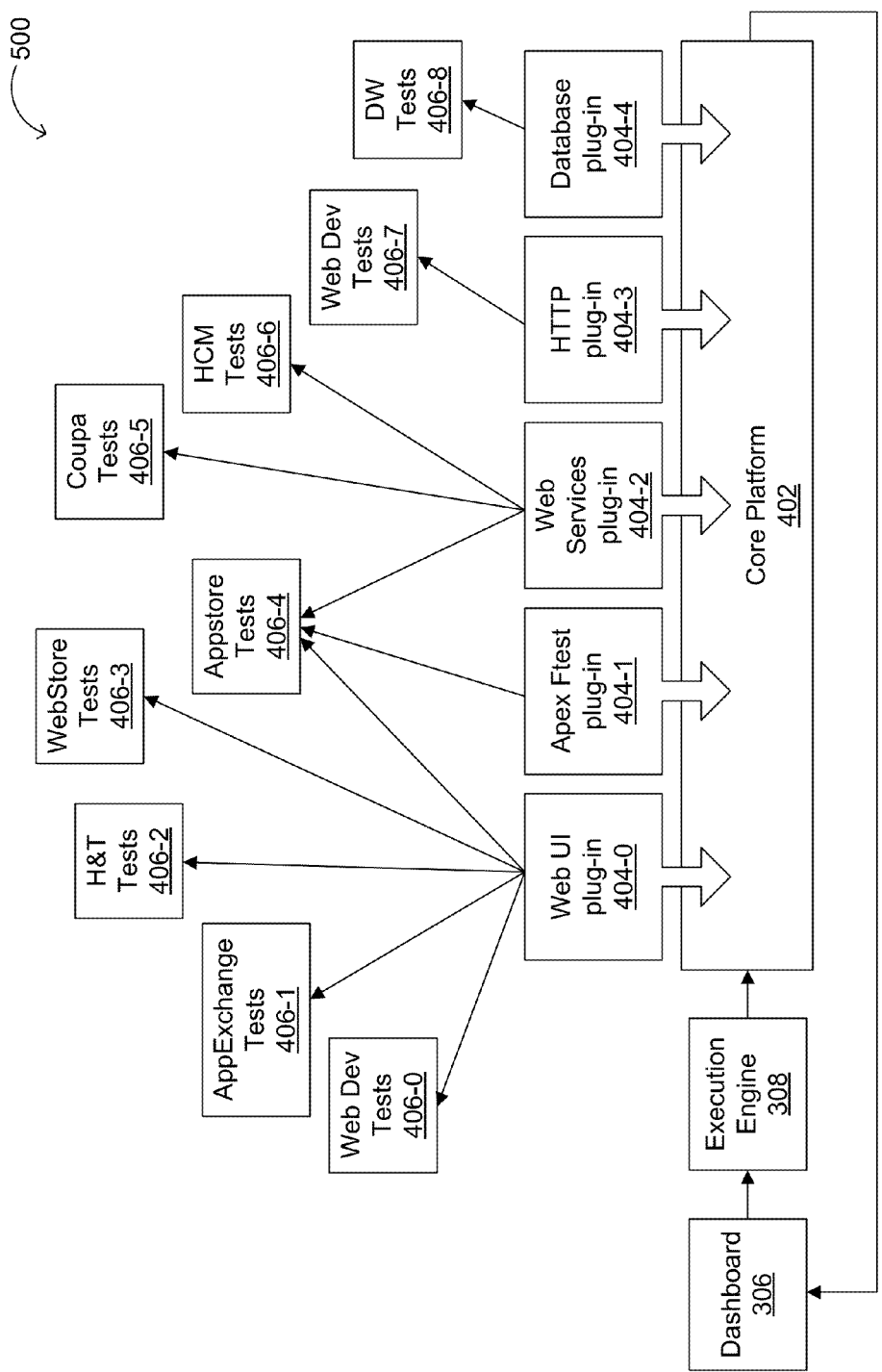
FIG. 5 is a block diagram of an example automation framework architecture, according to one embodiment.

FIG. 5 shows a block diagram of an example test framework architecture 500, according to one embodiment. As discussed above, a test framework can include an automation server or execution engine 308, an automation or repository dashboard 306, and an automation library 312. Dashboard 306 can be used for selecting from among tests 406 to be run. Other test definitions (e.g., which product layers are to be tested, which test tools are to be utilized, etc.), as well as user configurations (e.g., test scheduling, notification enabling, customizing test reports, test client controls, archiving controls, etc.), can also be specified via dashboard 306. In this fashion, selected tests can be executed (e.g., via execution engine 308) on-demand and/or scheduled, and according to such user configurations.

Alternatively or in addition to tests being executed on execution engine 308, a pool of available client machines (e.g., test clients 314) may be used to execute separate layers of a product, to represent separate environments for the product, or for any other suitable execution arrangement. In addition, test descriptions, user configurations, and results can be stored in dashboard 306. In one or more implementations, user configurations can be stored in association with user interface 302 (e.g., in user system 112) and/or in association with dashboard 306 (e.g., in system 116), or any suitable associated storage.

Automation library 312 can include core platform 402 and plug-ins 404. Core platform 402 can include an automation library of shared tools and utilities to perform core testing functionality. Plug-ins 404 can include test drivers tailored to execute, or otherwise integrate, specific types of tests via core platform 402. For example, plug-ins 404 can target various aspects of a particular product or layer of the product. In some implementations, one or more of tests 406 may be provided by other vendors, and are made to work with core platform 402 by incorporating an appropriate plug-in 404. Also in some implementations, one plug-in 404 may service a variety of different tests 406. Each plug-in 404 may also be intended to test a particular layer of a product. Further, plug-ins 404 may be directed to particular layers, environments, and/or test tool vendors, in order to facilitate product testing across desired layers and environments associated with that product.

Any number of plug-ins 404 can be coupled to core platform 402 in order to support any number of suitable tests. For example, web user interface (UI) plug-in 404-0 can include test drivers for executing tests, such as web development tests 406-0, AppExchange tests 406-1, help and training (H&T) tests 406-2, WebStore tests 406-3, and Appstore tests 406-4. Also for example, Apex Ftest plug-in 404-1 can include test drivers for executing tests, such as Appstore tests 406-4. H&T tests 406-2 can, e.g., test a portal application. Also for example, Web Services plug-in 404-2 can include test drivers for executing tests, such as Appstore tests 406-4, Coupa tests 406-5, and human capital management (HCM) tests 406-6. Also, hypertext transfer protocol (HTTP) plug-in 404-3 can include test drivers for executing tests, such as web development tests 406-7, and database plug-in 404-4 can include test drivers for executing tests, such as data warehouse (DW) tests 406-8. In addition, and as illustrated with respect to Appstore tests 406-4, one or more plug-ins may contain test drivers for this test or product line.

Any suitable technologies can be utilized in one or more implementations of an automated test framework. For example, a Selenium/HTML unit can be used for web UI testing, JUnit/TestNG for API testing, Apache Axis can be used for simple object access protocol (SOAP) web service testing, Apache HTTPComponents can be used for HTTP and representational state transfer (REST) web service testing, Spring/JDBC can be used for database testing, Ant can be used to execute build, test, and deploy jobs, DOM4j can be used for parsing XML and HTML data, Log4j can be used for logging test data, Hudson (or any suitable tool of choice) can be used for continuous integration, and Perforce (or any suitable tool of choice) can be used source control management.

Figure 6:
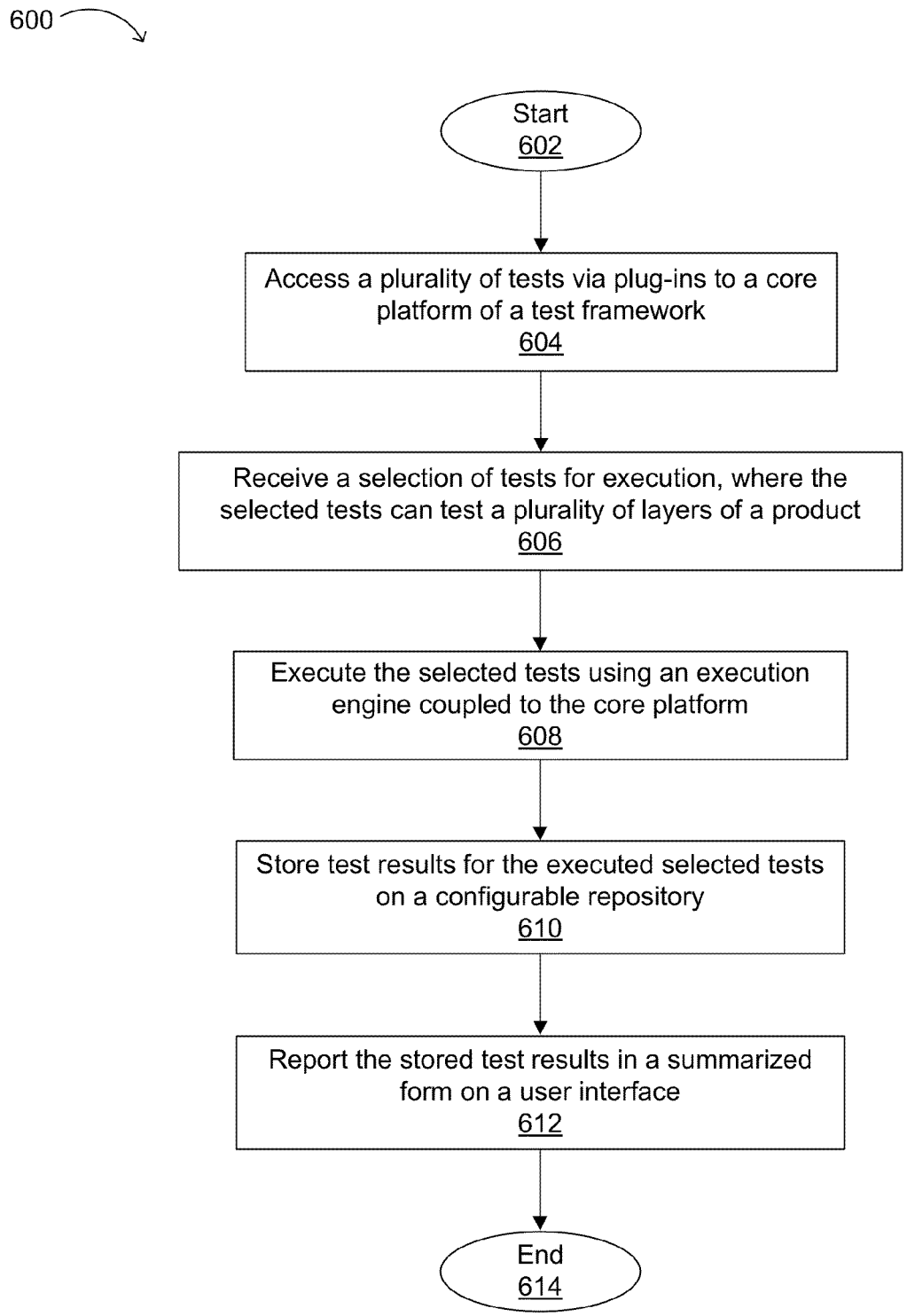
FIG. 6 is a flow diagram of an example method of providing a testing framework in an on-demand services environment, according to one embodiment.

FIG. 6 illustrates a flow diagram of an example method 600 of providing a test framework in an on-demand services environment, according to one embodiment. The flow can begin (602), and a plurality of tests can be accessed via plug-ins to a core platform of the test framework (604). For example, user interface 302 can be used to access dashboard 306, which can provide a list of which tests, as well as which plug-ins are available. If a test is selected for which no plug-in is currently available, an error message can be supplied so that the user is made aware and can obtain a new plug-in for the selected test. Here, the user can also set various user configurations (e.g., for test scheduling, notification enabling, customizing test reports, test client controls, archiving controls, etc.).

A selection of tests can be received for execution according to the user configurations, where the selected tests can test a plurality of layers of a product (606). The selected tests can be executed using an execution engine coupled to the core platform (608), and/or may also be sent to one or more test clients. In this fashion, execution engine 308 and test clients 314 can operate in a master-slave session. The test results for the executed selected tests can be stored on a configurable repository (610). For example, dashboard 306 may be a configurable repository dashboard that includes such storage capacity, and/or test result data may be separately stored, but accessible via dashboard 306. The stored test results can then be reported in a summarized form on the user interface (612), completing the flow (614). As discussed above, user configurations can also be employed to determine what type and what summarized form of information is available in the test results.

Figure 7:
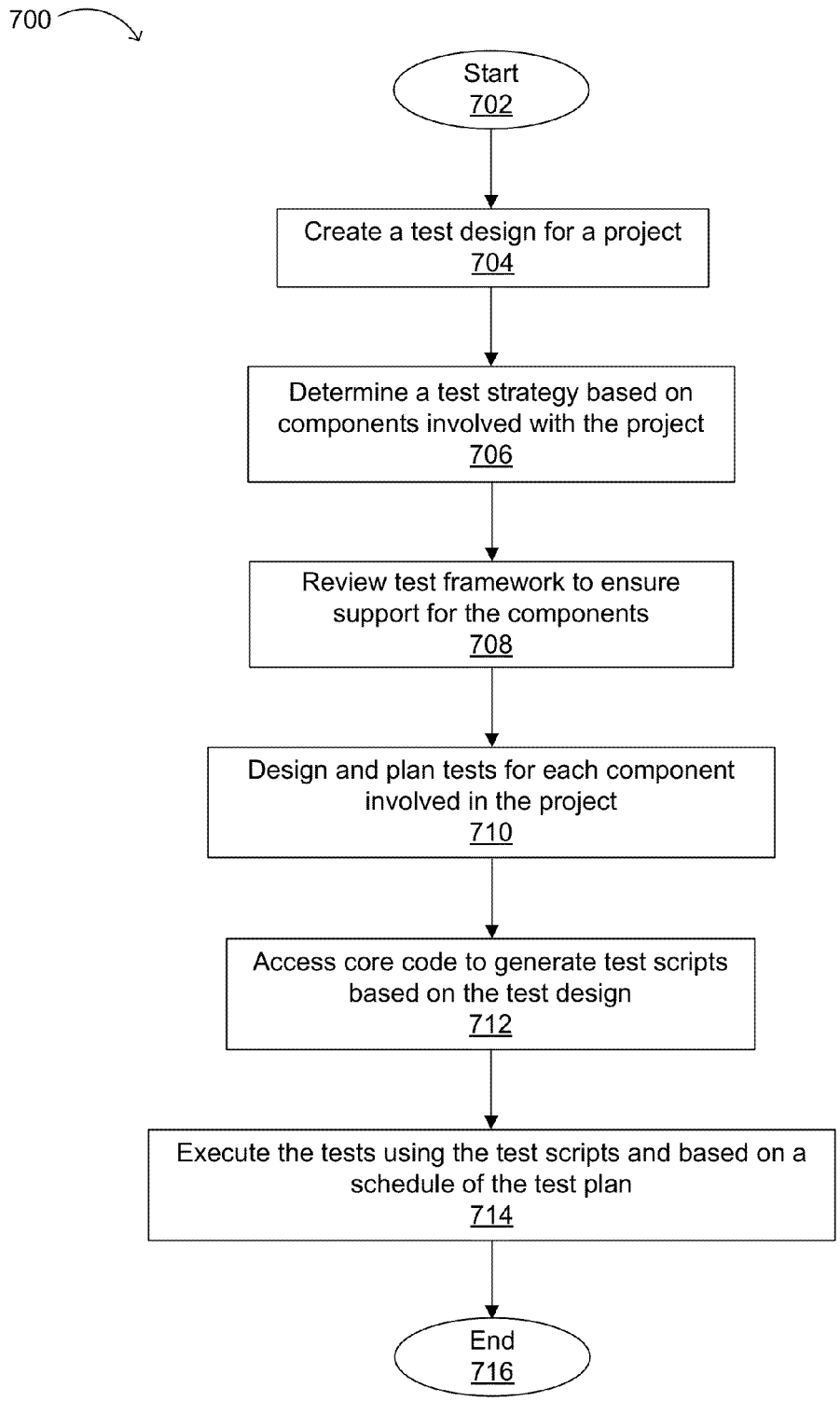
FIG. 7 is a flow diagram of an example method of using a testing framework, according to one embodiment.

FIG. 7 shows a flow diagram of an example method 700 of using a test framework, according to one embodiment. The flow begins (702), and a test design for a project or product can be created (704). For example, a design team may develop a new project for an Appstore solution developed on a salesforce.com platform along with $3^{rd}$ party systems integration. In this example, the test design may describe test methodology/approach, application platform, and browser support, for the project. The test design may also specifically include which layers and which environments are to be tested, and by which test tools.

A test strategy can be determined based on components involved with the project (706). In one example, the involved components can include Web UI, Apex, and Web services. The test framework can then be reviewed in order to ensure support exists for the components (708). For example, a "component" may be a layer, and in some cases may represent a lower or lowest level of working code (e.g., framework code level), while a layer may represent an application product level. In any event, such components or layers can be mapped to plug-in and corresponding test tool support. For example, plug-ins 404 can be reviewed in order to find appropriate test drivers, such as Web UI plug-in 404-0, Apex Ftest plug-in 404-1, and Web services plug-in 404-2, that will work with these identified components/layers for the product to be tested.

Tests for each component or layer involved in the project can be designed and planned (710). For example, any functions or scripts can be accessed or otherwise created in order to support each particular test to be executed. In one or more implementations, if the test tools and associated plug-ins are readily available, then these can be identified and selected via dashboard 306. However, if they are not readily available, then an appropriate test tool may be identified and/or an associated plug-in created. Core test code can be accessed to generate test scripts based on the test design (712). For example, SCM can be employed to access test code 320, and/or test scripts may be written. Such test scripts or other code review can then occur, followed by check-in to the SCM system in order to maintain version control.

Tests that are selected can then be executed using the test scripts, and based on a schedule of the test plan (714). User configurations can be accessed to determine a desired test schedule. For example, tests can be run on a predetermined schedule (e.g., a designated day/time), in response to designated events (e.g., other tests being run) and/or on-demand, and may be in a centralized or distributed execution environment (e.g., using test clients 314). Test results can then be published (e.g., via test reports 310 accessible via dashboard 306), thus completing the flow (716). As discussed above, various graphical test results can be provided based on user configurations.

In one or more implementations, a test framework can be built on a Java™ and Web 2.0 technology based architecture, thus reducing installation requirements as compared to other approaches. Particular embodiments also allow for integration with any test content repository, defect management system, as well as any suitable continuous integration (CI) tool, resulting in increased flexibility. In addition, certain embodiments provide modular and extensible testing by accommodating testing of different products, application layers, as well as different types of testing.

Various embodiments also provide agnostic testing of applications, such as in a cloud arrangement, or in a client/server arrangement. Any application can be tested in a cloud and/or client/server mode. For example, a process of a user making a database call or object access and receiving data in return, can be tested independent of the particular cloud or client/server arrangement of accessing that database. In addition, aspects of various implementations may be browser and platform independent, and can also run in a distributed environment using virtual machines or test clients. Further, test coverage can also be leveraged for unit, as well as component/level, functional and regression testing.

Thus, particular embodiments provide an ability to test different products, layers of the application, and can also perform various types of testing. In one particular order management example, an opportunity for billing business process can include multiple sub-processes, such as UI, API, and/or WS calls between systems and transactional data processing (bulk) with database commits. One or more implementations as described herein may be effectively used to create tests for testing the layers independently at a component level, thus ensuring code path coverage and test coverage, and also providing testing across these layers to ensure transactional data integrity.

Figure 8:
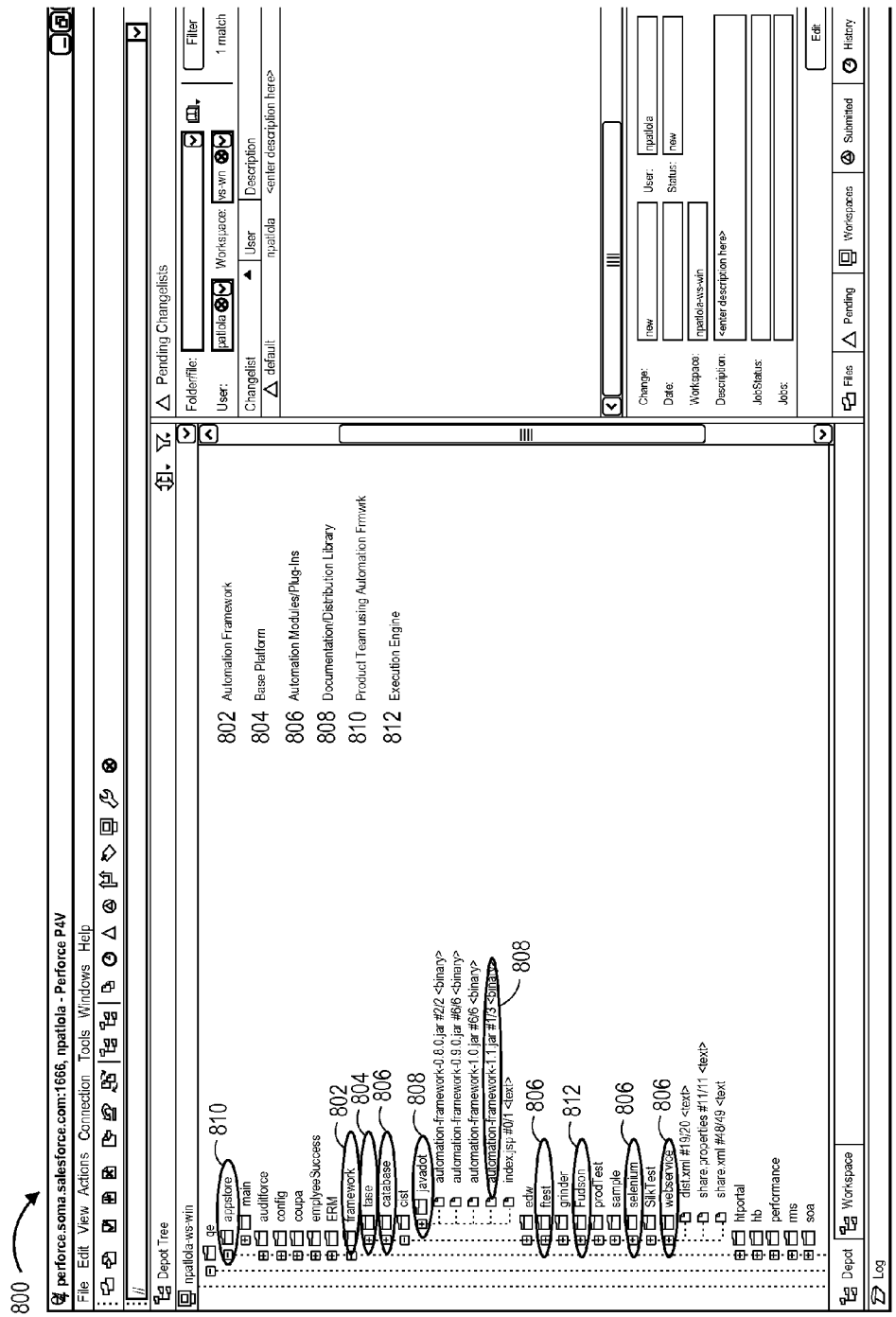
FIG. 8 is a screenshot showing an example of source code arrangement for an automation framework, according to one embodiment.

FIG. 8 illustrates a screenshot example 800 of source code arrangement for an automation framework, according to one embodiment. This is one example of how source code may be organized along with associated components and execution engine for a test framework. As illustrated, automation framework 802 can include source code for base platform 804, as well as plug-ins or automation modules 806 (e.g., database, Apex Ftest, selenium, Web service, etc.). Automation framework 802 can also include document distribution library 808 (e.g., under "javadoc"). A product team using the automated framework, or the particular product to be tested can be identified in a product test scripts location folder 810 (e.g., "appstore"), for use by the framework for creating and executing the test scripts. In addition, source code 812 for the particular execution engine, can be found under application framework 802 (e.g., Hudson).

Figure 9:
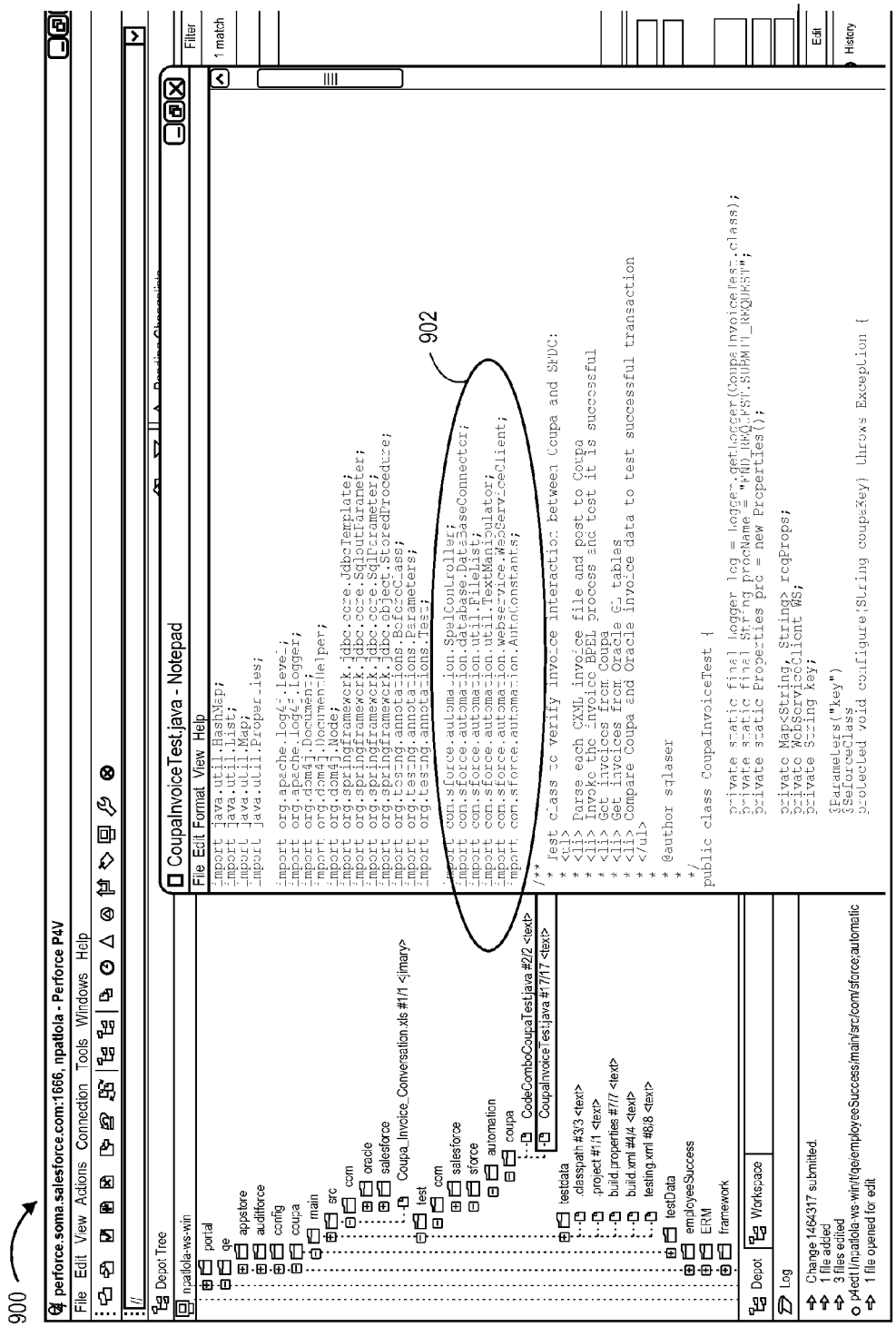
FIG. 9 is a screenshot showing an example test script referencing for an automation framework, according to one embodiment.

FIG. 9 shows a screenshot example 900 of test script referencing for a test framework, according to one embodiment. As illustrated, for a Coupa invoice test (e.g., Coupa tests 406-5), test script references can import framework utilities 902. For example, framework utilities 902 can be used in Coupa tests 406-5, which also utilize Web services plug-in 404-2. The utilities can essentially use the plug-ins as part of core platform 402. In this fashion, the test framework may be called from within the test script, such as for testing the Coupa end-to-end solution.

Figure 10:
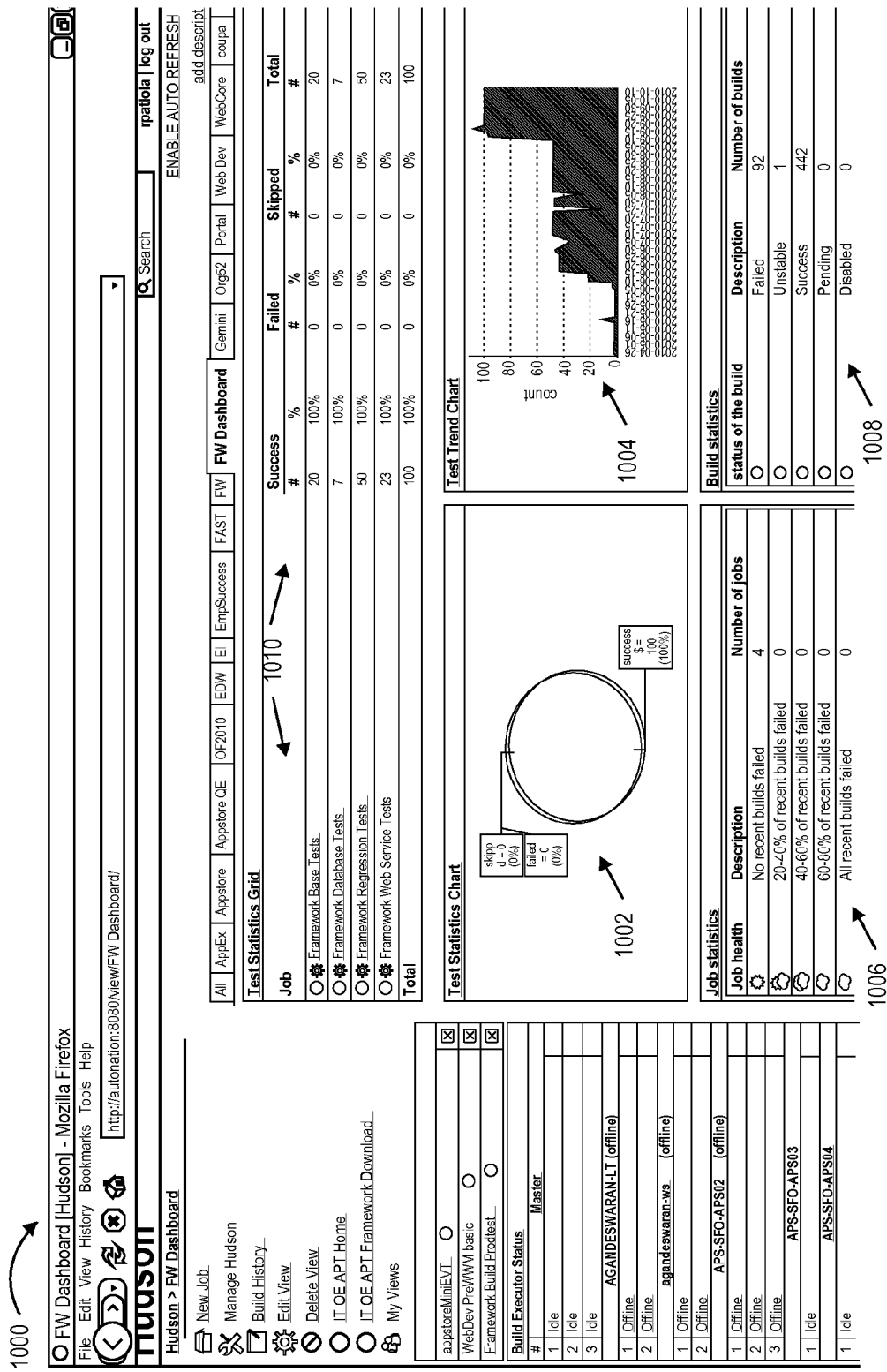
FIG. 10 is a screenshot showing an example dashboard for an automation framework, according to one embodiment.

FIG. 10 illustrates a screenshot example 1000 dashboard for an automation framework, according to one embodiment. Such test result information can be found in test reports 310, and may be accessible via dashboard 306 and/or user interface 302. Example test result information in summarized form includes a test statistics chart 1002 showing successful tests, failed tests, and skipped tests. Other test result information can include test trend charts 1004, job statistics 1006, build statistics 1008, and a test statistics grid 1010. Graphical presentations (e.g., test statistics chart 1002, test trend chart 1004, etc.) can be designated or tailored based on user configurations. For example, some information may be disabled, such as if a user does not care to see a test trend chart, while other test result information can be enabled. Further, the presentation of the summarized form (e.g., pie chart, bar graph, textual listing, etc.) can be specified for each type of data tracked in the test report.

Various aspects of particular embodiments can be implemented using any suitable function, tool, application, code, add-on, etc., to a website or navigation tool, such as a special cookie that may be configured on the website. The code may be downloaded from a server to a client, from system 116 to user system 112, and/or from any suitable arrangement. As discussed above, such code to implement various aspects of particular embodiments can include any suitable programming language (e.g., HTML, Apex, C, Javascript, etc.).

In a multi-tenant database system, a database can generally be viewed as a collection of objects, such as a set of logical tables, containing data fitted into predefined categories. A "table" is one representation of a data object, and may be used herein to simplify the conceptual description of objects and custom objects according to the present invention. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Any suitable programming language can be used to implement the routines of particular embodiments including C, C++, Java™, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

A "processor" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. A computer may be any processor in communication with a memory. The memory may be any suitable processor-readable storage medium, such as random-access memory (RAM), read-only memory (ROM), magnetic or optical disk, or other tangible media suitable for storing instructions for execution by the processor.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method of providing a test framework in an on-demand services environment, the method comprising:
   accessing a plurality of tests via plug-ins to a core platform of the test framework;
   receiving, by a user interface, a selection of tests for execution from the plurality of tests, wherein the selected tests are configured to test a plurality of layers of a software product, wherein one of the plurality of layers of the software product comprises: a graphical user interface (GUI) layer, a web service layer, an application programming interface (API) layer, a database layer, or a network test layer;
   executing, by an execution engine coupled to the core platform, the selected tests;
   storing test results for the executed selected tests on a configurable repository; and
   reporting the stored test results in a summarized form on the user interface.

2. The method of claim 1, wherein the executing the selected tests begins in response to a designation in a predetermined schedule.

3. The method of claim 1, wherein the executing the selected tests begins in response to occurrence of a triggered event.

4. The method of claim 1, wherein the executing the selected tests begins in response to an on-demand invocation.

5. The method of claim 1, further comprising:
   determining the plug-ins for each of the layers of the software product to be tested.

6. The method of claim 1, wherein the executing the selected tests comprises distributing execution from the execution engine to a plurality of test clients.

7. The method of claim 1, further comprising:
   controlling versions of code for the tests by using source code management (SCM).

8. The method of claim 1, further comprising:
   extending the core platform to support a new test by adding a new plug-in.

9. The method of claim 1, wherein two of the plurality of layers of the software product comprise two of: the graphical user interface (GUI) layer, the web service layer, an application programming interface (API) layer, the database layer, and the network test layer.

10. The method of claim 1, wherein three of the plurality of layers of the software product comprise three of: the graphical user interface (GUI) layer, the web service layer, an application programming interface (API) layer, the database layer, and the network test layer.

11. The method of claim 1, wherein four of the plurality of layers of the software product comprise four of: the graphical user interface (GUI) layer, the web service layer, an application programming interface (API) layer, the database layer, and the network test layer.

12. The method of claim 1, wherein the plurality of layers of the software product comprise: the graphical user interface (GUI) layer, the web service layer, an application programming interface (API) layer, the database layer, and the network test layer.

13. A non-transitory computer-readable storage medium having one or more instructions thereon for providing a test framework in an on-demand services environment, the instructions when executed by one or more processors causing the one or more processors to carry out:
   accessing a plurality of tests via plug-ins to a core platform of the test framework;
   receiving, by a user interface, a selection of tests for execution from the plurality of tests, wherein the selected tests are configured to test a plurality of layers of a software product, wherein one of the plurality of layers of the software product comprises: a graphical user interface (GUI) layer, a web service layer, an application programming interface (API) layer, a database layer, or a network test layer;
   executing, by an execution engine coupled to the core platform, the selected tests;
   storing test results for the executed selected tests on a configurable repository; and
   reporting the stored test results in a summarized form on the user interface.

14. The computer-readable storage medium of claim 13, wherein the executing the selected tests begins in response to at least one of: a designation in a predetermined schedule, occurrence of a triggered event, and an on-demand invocation.

15. The computer-readable storage medium of claim 13, wherein the instructions when executed further cause the one or more processors to carry out:
   determining the plug-ins for each of the layers of the software product to be tested.

16. The computer-readable storage medium of claim 13, wherein the executing the selected tests comprises distributing execution from the execution engine to a plurality of test clients.

17. The computer-readable storage medium of claim 13, wherein the instructions when executed further cause the one or more processors to carry out:
   controlling versions of code for the tests by using source code management (SCM).

18. The computer-readable storage medium of claim 13, wherein the instructions when executed further cause the one or more processors to carry out:
   extending the core platform to support a new test by adding a new plug-in.

19. The computer-readable storage medium of claim 13, wherein two of the plurality of layers of the software product comprise two of: the graphical user interface (GUI) layer, the web service layer, an application programming interface (API) layer, the database layer, and the network test layer.

20. The computer-readable storage medium of claim 13, wherein three of the plurality of layers of the software product comprise three of: the graphical user interface (GUI) layer, the web service layer, an application programming interface (API) layer, the database layer, and the network test layer.

21. The computer-readable storage medium of claim 13, wherein four of the plurality of layers of the software product comprise four of: the graphical user interface (GUI) layer, the web service layer, an application programming interface (API) layer, the database layer, and the network test layer.

22. The computer-readable storage medium of claim 13, wherein the plurality of layers of the software product comprise: the graphical user interface (GUI) layer, the web service layer, an application programming interface (API) layer, the database layer, and the network test layer.

23. An apparatus for providing a test framework in an on-demand services environment, the apparatus comprising:
   a processor; and
   one or more stored sequences of instructions which, when executed by the processor, cause the processor to carry out:
      accessing a plurality of tests via plug-ins to a core platform of the test framework;
      receiving, by a user interface, a selection of tests for execution from the plurality of tests, wherein the selected tests are configured to test a plurality of layers of a software product, wherein one of the plurality of layers of the software product comprises: a graphical user interface (GUI) layer, a web service layer, an application programming interface (API) layer, a database layer, or a network test layer;
      executing, by an execution engine coupled to the core platform, the selected tests;
      storing test results for the executed selected tests on a configurable repository; and
      reporting the stored test results in a summarized form on the user interface.

24. The apparatus of claim 23, wherein the executing the selected tests begins in response to at least one of: a designation in a predetermined schedule, occurrence of a triggered event, and an on-demand invocation.

25. The apparatus of claim 23, wherein the instructions when executed further cause the processor to carry out:
   determining the plug-ins for each of the layers of the software product to be tested.

26. The apparatus of claim 23, wherein the executing the selected tests comprises distributing execution from the execution engine to a plurality of test clients.

27. The apparatus of claim 23, wherein the instructions when executed further cause the processor to carry out:
   controlling versions of code for the tests by using source code management (SCM).

28. The apparatus of claim 23, wherein the instructions when executed further cause the processor to carry out:
   extending the core platform to support a new test by adding a new plug-in.

29. The apparatus of claim 23, wherein two of the plurality of layers of the software product comprise two of: the graphical user interface (GUI) layer, the web service layer, an application programming interface (API) layer, the database layer, and the network test layer.

30. The apparatus of claim 23, wherein three of the plurality of layers of the software product comprise three of: the graphical user interface (GUI) layer, the web service layer, an application programming interface (API) layer, the database layer, and the network test layer.

31. The apparatus of claim 23, wherein four of the plurality of layers of the software product comprise four of: the graphical user interface (GUI) layer, the web service layer, an application programming interface (API) layer, the database layer, and the network test layer.

32. The apparatus of claim 23, wherein the plurality of layers of the software product comprise: the graphical user interface (GUI) layer, the web service layer, an application programming interface (API) layer, the database layer, and the network test layer.

* * * * *